F. Wagner,
Converting Motion.
No. 112,991. Patented Mar. 21, 1871.

Witnesses.
C. Wahlers
E. Bilhuber

Inventor.
Franz Wagner
per
Van Santvoord & Hauff
Attys

United States Patent Office.

FRANZ WAGNER, OF NEW YORK, N. Y.

Letters Patent No. 112,991, dated March 21, 1871.

IMPROVEMENT IN APPARATUS FOR CONVERTING RECIPROCATING INTO ROTARY MOTION.

The Schedule referred to in these Letters Patent and making part of the same.

*To all whom it may concern:*

Be it known that I, FRANZ WAGNER, of the city, county, and State of New York, have invented a new and useful Improvement in Converting Motion; and I do hereby declare the following to be a full, clear, and exact description thereof, which will enable those skilled in the art to make and use the same, reference being had to the accompanying drawing forming part of this specification, in which drawing—

Similar letters indicate corresponding parts.

Figure 1:
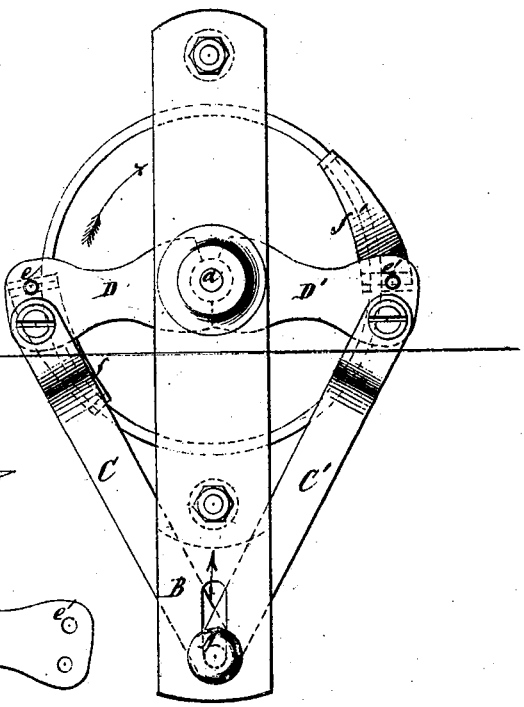
Figure 1 represents a plan or face view of this invention.

This invention relates to a device for converting reciprocating motion into an intermittent rotary motion, said device being so arranged that the wheel or shaft, to which the rotary motion is to be imparted, will be caused to turn at the forward stroke as well as the backward stroke of a reciprocating cross-head or slide.

To effect this purpose two spring dogs are applied to the rim of the wheel diagonally opposite to each other, each of the dogs being connected to the reciprocating slide in such a manner that the same act alternately on the wheel, while both impart to the wheel a revolving motion in one and the same direction.

In the drawing—

The letter A designates a slide, to which a reciprocating motion is imparted by any suitable power, and which is guided in a slotted bar, B, or by any desirable means.

Figure 4:
Figure 4 is a detached plan of the same.
Figure 5:
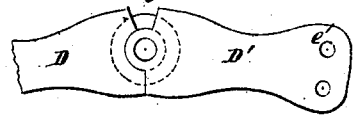

Said slide connects by rods C C' with two levers D D', which swing on the arbor *a* of the wheel E, the lever D being provided with a tubular hub, *b*, (see fig. 4,) which embraces the tubular hub *c* of the lever D', the latter being fitted on the arbor *a*.

Said levers D D' are perforated near their outer ends with holes *e e'*, to receive the dogs *d d'*, said dogs being loosely inserted in the holes of the levers, so that they are free to oscillate therein within certain limits.

Figure 2:
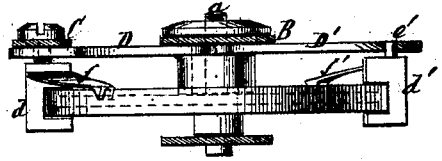
Figure 2 is a transverse section of the same.

The dogs are made U-shaped, and they embrace the rim of the wheel E, as shown in fig. 2, and each of the dogs is subjected to the action of a weak spring, *f* or *f'*, which has a tendency to throw its dog in an oblique position, (see fig. 3,) causing the same to catch hold of the rim of the wheel.

Figure 3:
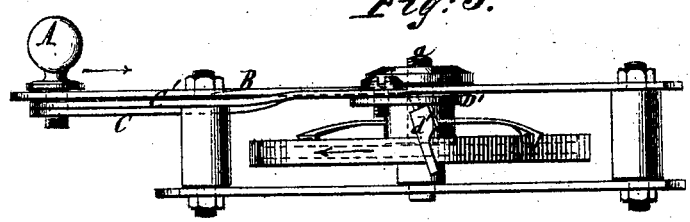
Figure 3 is a side view of the same.

If the slide A is moved in the direction of the arrow, marked near it in figs. 1 and 3, the lever D' has a tendency to throw its dog in an upright position against the action of the spring *f'*, and said dog slides over the rim of the wheel without imparting to it any motion, but at the same time the lever D has a tendency to throw its dog in the same direction in which it is thrown by its spring, and said dog is caused to take a firm hold on the rim of the wheel, and to turn the same in the direction of the arrow marked on it in fig. 1.

By moving the slide back, the dog *d* is caused to release the wheel, while the dog *d'* catches hold of the same, and imparts to it a revolving motion in the same direction as before.

By these means the slightest motion of the slide A is transmitted to the wheel, causing the wheel to turn in one and the same direction, and a device is obtained which can be used with great advantage for converting the reciprocating motion of a fluid meter, for instance, in a rotary motion of the registering-wheels, and which operates without fail, the dogs being loosely inserted in the ends of the levers D D', so that they are capable of taking hold of the wheel at the proper time.

What I claim as new, and desire to secure by Letters Patent, is—

The dogs *d d'*, overlapping the rim of a wheel, E, on opposite sides thereof, and inserted loosely in the ends of levers D D', in combination with springs *f f'*, rods C C', and reciprocating slide A, substantially as and for the purpose shown and described.

This specification signed by me this 22d day of October, 1870.

FRANZ WAGNER.

Witnesses:
W. HAUFF,
E. F. KASTENHUBER.